United States Patent [19]
McClive

[11] 3,717,364
[45] Feb. 20, 1973

[54] TRAILER HITCH

[76] Inventor: William J. McClive, 24019 Hartford Street, Canoga Park, Calif. 91304

[22] Filed: Oct. 26, 1971

[21] Appl. No.: 191,997

[52] U.S. Cl..............280/489, 280/406 A, 280/503, 280/460 R
[51] Int. Cl..........................B60d 1/12, B62d 53/00
[58] Field of Search.......280/489, 406 A, 503, 460 R

[56] References Cited

UNITED STATES PATENTS

| | | | |
|---|---|---|---|
| 2,738,206 | 3/1956 | Loughner | 280/406 A X |
| 2,772,098 | 11/1956 | Seeley | 280/406 A |
| 2,789,834 | 4/1957 | Chism | 280/406 A |
| 2,828,144 | 3/1958 | Hosmer | 280/406 A X |
| 3,175,845 | 3/1965 | McClive | 280/460 R |
| 3,434,735 | 3/1969 | Bernard | 280/406 A |
| 3,482,856 | 12/1969 | Reese | 280/406 A |

Primary Examiner—Leo Friaglia
Attorney—Forrest J. Lilly

[57] ABSTRACT

A trailer hitch for coupling a trailer to a towing vehicle. The hitch has a U-shaped frame with arms which straddle and are attached by rotary couplings to the rear vehicle wheels, a stabilizer bracket attached to the trailer hitch tongue, and a stabilizer bar hinged to the rear cross member of the frame in line with a coupling ball on the frame and extending rearwardly through a guide opening in the stabilizer bracket. The stabilizer bar and bracket transfer the trailer tongue load through the hitch frame to the rear vehicle wheels and are movable fore and aft relative to one another in a manner which reduces substantially the loading on the coupling ball and socket when traveling over dips and humps and permits use of the hitch with a trailer having a surge brake. Other advantages of the hitch are its adaptability to trailers and vehicles of a wide range of types and sizes, reduced bounce and sway of the towing vehicle, and reduced pitching of the trailer when passing over dips and humps.

17 Claims, 5 Drawing Figures

PATENTED FEB 20 1973 3,717,364
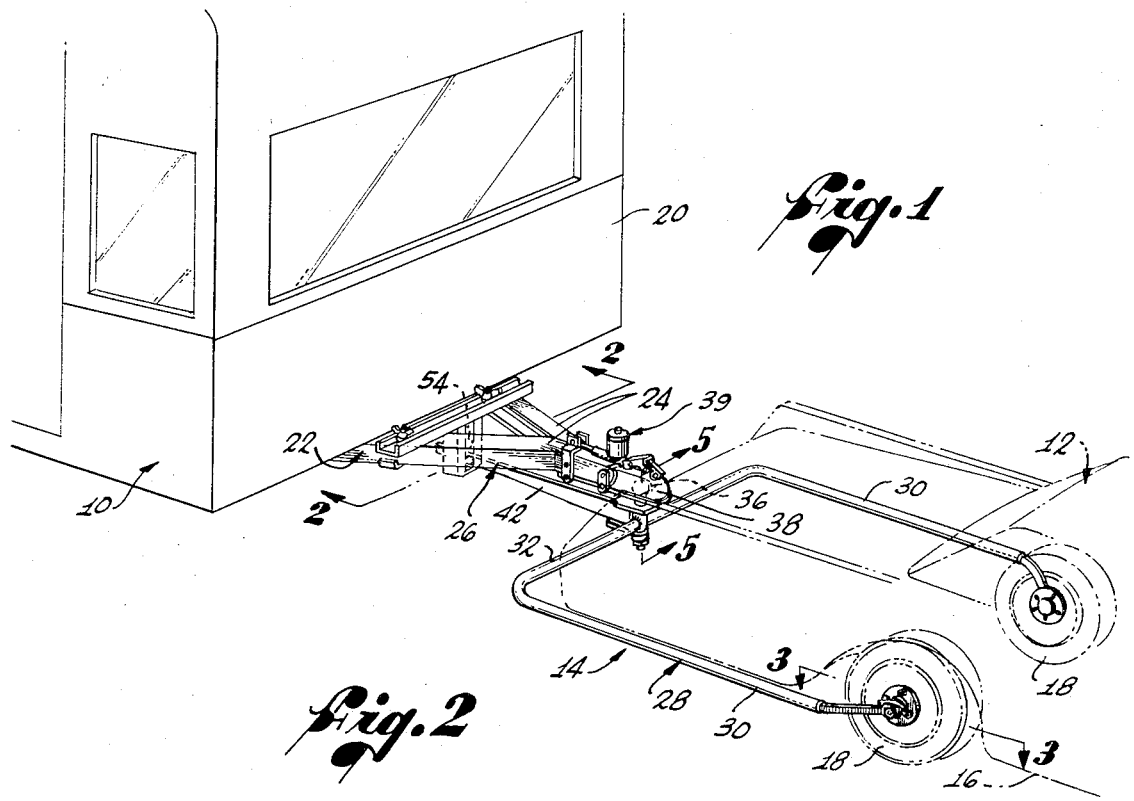
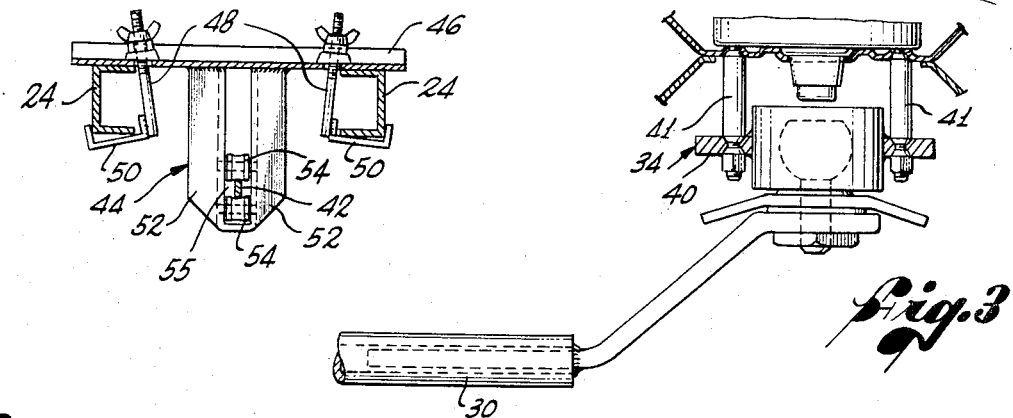
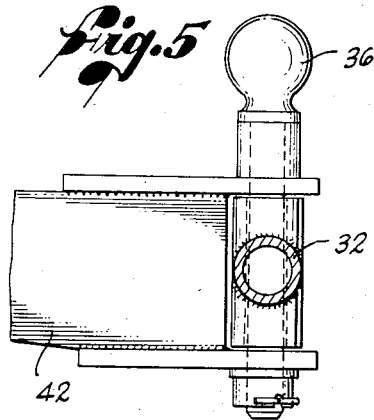
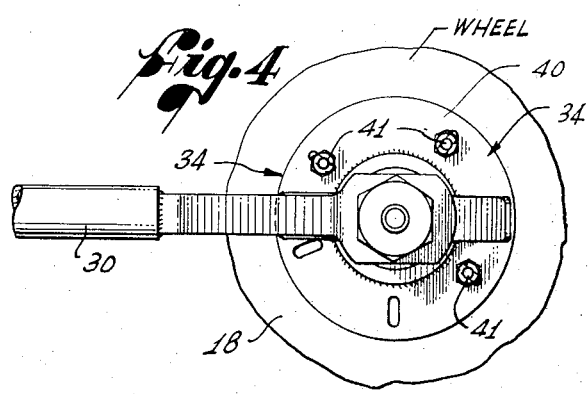

TRAILER HITCH

BACKGROUND OF THE INVENTION

1. Field of the Invention

This invention relates generally to trailers and more particularly to a novel hitch for coupling and trailer to a towing vehicle.

2. Description of the Prior Art

A simple trailer hitch in its present-day form consists of a coupling ball mounted at the rear of the towing vehicle and a coupling socket on the front end of the trailer hitch tongue receiving the ball to provide a swivel coupling between the trailer and vehicle. One disadvantage of this simple hitch construction resides in the fact that it concentrates the trailer tongue load on the rear springs of the towing vehicle. As a consequence, the springs depress substantially, often to such an extent that the vehicle chasis either rests on the rear axle or strikes the axle during even relatively light road bounce of the chassis in travel. Such depression of the rear springs also results in vertical angular movement of the vehicle chassis and trailer from their normal horizontal attitudes and relative angular movement of the coupling ball from its normal position wherein the vertical axis of the ball is normal to the plane of the trailer tongue. This relative angular movement of the ball axis produces an additional stress on the coupling ball. Moreover, when passing over a dip or hump, the angle between vehicle and trailer axis changes substantially, thereby placing even greater stress on the coupling. In this disclosure, the vertical angular movement of the trailer occasioned by passage of the vehicle and trailer over a dip or hump is referred to as pitching of the trailer, with the existing hitches, the trailer pitches considerably when passing over a dip or hump.

So-called stabilizers have been devised to aleviate the above disadvantages of the simple ball and socket hitch. Such a stabilizer is essentially a spring loaded brace which is connected between the chassis of the towing vehicle and trailer hitch tongue in a manner which tends to distribute the trailer tongue load equally between the front and rear vehicle springs and thereby maintain both the trailer and vehicle generally horizontal when on a flat road surface. Trailer hitches equipped with such stabilizers also have certain disadvantages, however. One of these disadvantages resides in the fact that when passing over dips and humps, the stabilizer yields to permit relative angular movement of the trailer and vehicle chassis from their normally horizontal attitudes. This relative angular movement causes relative swivel movement of the coupling ball and socket in the vertical plane from their normal positions wherein the vertical ball axis is normal to the plane of the hitch tongue and places increased stress on the ball. Moreover, a trailer surge brake will not operate effectively with such a stabilizer when passing over dips and humps for the reason that the tension in the stabilizer spring occasioned by yielding of the stabilizer under these conditions inhibits or retards the action of the surge brake.

SUMMARY OF THE INVENTION

The present invention provides a trailer hitch which avoids the above problems inherent in the existing trailer hitches. The trailer hitch of the invention has a generally U-shaped frame including a pair of spaced generally parallel arms and a rear cross member extending between and joining the rear ends of the arms. On the front ends of the arms are rotary wheel couplings which may be similar to those described in my prior U.S. Pat. No. 3,175,845. The frame is installed on a towing vehicle by plaing the frame arms in straddling relation with the rear end of the vehicle and its rear wheels and attaching the couplings to the wheels in the manner described in the above patent. The frame may be yieldable or hinged to permit adjustment of the spacing between the wheel couplings for accommodating the frame to installation on towing vehicles of various makes, types and rear wheel spacings.

Rigidly attached to the outer of the rear cross member of the frame is a coupling ball. A stabilizer bar is hinged at its front end to the center of the rear cross member for swinging laterally of the frame on an axis normal to the plane of the frame.

In addition to the structure described thus far, the trailer hitch has a stabilizer bracket with means for either removably or permanently mounting the bracket on the trailer hitch tongue, rearwardly of the coupling socket on the front end of the tongue. This bracket has a guide opening through which the rear end of the stabilizer bar extends in such a way that the bar and bracket can move relative to one another longitudinally of the bar. In the disclosed embodiment, this bracket guide opening is defined by a pair of circumferentially grooved rollers which straddle the stabilizer bar verticlly and engage the upper and lower bar edges. The stabilizer bar and bracket maintain the plane of the hitch frame and the plane of the trailer tongue generally parallel to one another at all times and transfer the trailer tongue load through the frame directly to the rear vehicle wheels.

The trailer hitch has several advantages. Thus, the vertical axis of the coupling ball remains generally normal to the plane of the trailer hitch tongue at all times, even when passing over dips and humps with the result that the stress on the coupling ball is not increased under these conditions. Thus, when passing over dips and humps, the towing vehicle and hitch frame merely rotate relative to one another about the rear wheel axis of the vehicle without creating any forces which would tend to rotate the frame vertically relative to the trailer. This constant perpendicular relation of the vertical coupling ball axis with respect to the plane of the trailer hitch tongue in combination with the freedom of relative fore and aft movement of the stabilizer and a bracket also permits use of the hitch with a trailer having a surge brake. In other words, the trailer hitch does not impede or retard the action of the surge brake when passing over dips and humps.

The present trailer hitch is also easy to install on a trailer and towing vehicle and may be used with virtually any make and type of trailer and vehicle. Moreover, since the hitch pivots above the rear wheel axis of the towing vehicle, the trailer undergoes substantially less pitching, that is pivoting about its wheel axis, when passing over dips and humps. Finally, the trailer tongue load and towing forces are exerted directly on the rear wheels of the towing vehicle rather than on the vehicle chassis. As a consequence, these loads do not produce any substantial bouncing, swaying, or jolting of the vehicle in travel.

BRIEF DESCRIPTION OF THE DRAWINGS

FIG. 1 is a perspective view of a trailer hitch according to the invention installed on a trailer and towing vehicle;

FIG. 2 is an enlarged section taken on line 2—2 in FIG. 1;

FIG. 3 is an enlarged section taken on line 3—3 in FIG. 1;

FIG. 4 is a side elevation of the wheel coupling shown in FIG. 3; and

FIG. 5 is an enlarged vertical section taken on line 5—5 in FIG. 1 with the trailer coupling socket omitted for clarity.

BRIEF DESCRIPTION OF THE PREFERRED EMBODIMENT

The drawings illustrate a travel trailer 10 coupled to a towing vehicle 12 by means of an improved trailer hitch 14 according to the invention. The towing vehicle and trailer are conventional and hence need be described only in sufficient detail to provide a clear understanding of the invention. Towing vehicle 12 has a chassis 16 with rear wheels 18 removably mounted on the rear axle by means of lugs and lug nuts (not shown). Trailer 10 has a coach 20 mounted on a frame 22 including longitudinal frame members 24. The front ends of these frame members project forwardly of the coach in converging relation and are joined at their front extremities to form a hitch tongue 26.

The present trailer hitch 14 couples the trailer hitch tongue 26 to the rear wheels 18 of the towing vehicle 12. Referring particularly to FIG. 1, the trailer hitch 14 comprises a generally U-shaped hitch frame 28 with spaced generally parallel forwardly projecting arms 30 and a rear cross member 32 extending between and joining the rear ends of the arms. When the hitch is installed on the vehicle 12, the front ends of the hitch arms 30 straddle the rear vehicle wheels 18. Rotatably mounted on the front ends of the arms 30 are wheel couplings 34 for connection to the rear wheels, the hitch cross member 32 mounts a coupling part 36 at its center for releasable coupling engagement with a mating coupling part 38 on the front end of the trailer hitch tongue 26. The coupling parts 36, 38 shown are a conventional coupling ball and socket.

The particular trailer shown has a surge brake 39. This surge brake is conventional and need not be explained in detail. Suffice it to say that in a brake of this type, the front end of the trailer tongue 26 with the coupling socket 38 is movable fore and aft relative to the rear part of the tongue and the remainder of the trailer. When the towing vehicle is braked, the rear part of the tongue and the trailer proper move forwardly relative to the front socket end of the tongue to actuate the surge brake.

The trailer hitch wheel couplings 34 are like those disclosed in my prior U.S. Pat. No. 3,175,845 and hence need not be described in elaborate detail. Suffice it to say that these couplings have rotary coupling members or plates 40 which are rotatably swivelled on the front ends of the hitch arms 30. These coupling plates have holes to receive extension lugs 41 threaded on certain of the rear wheel lug bolts, after which the lug nuts are threaded on the extension to fasten the coupling plates coaxially to the wheels. As explained in the above patent, the coupling plate holes are arranged to permit mounting of the plates on virtually all passenger vehicles. Also the arms 30 are adjustable toward and away from one another to accommodate different widths of automotive vehicles. This adjustment may be accomplished in various ways. For example, the hitch arms 30 of hitch 14 are resilient to permit springing of the arms toward and away from one another sufficiently to accomplish the adjustment. Alternatively, the hitch frame may be hinged to permit swinging of the hitch arms toward and away from one another for adjustment.

Extending rearwardly from the center of the trailer hitch cross member 32 is a relatively rigid stabilizer bar 42. The front end of this bar is joined by a hinge 43 to the center of the cross member, just below and on the vertical axis of the coupling ball 36. The rear end of the bar extends through a stabilizer bracket 44 to be mounted on the rear end of the trailer hitch tongue 26. Bracket 44 has an upper plate or channel 46 adapted to extend between and seat on top of the trailer hitch tongue frame members 24. Extending through the ends of the plate 46 are bolts 48 with lower clamp members 50 which are engagable under the tongue frame members 24, bolts 48 may be tightened to firmly clamp the stabilizer bracket 44 to the trailer hitch tongue 26.

Depending from and rigidly joined to the center of the bracket plate 46 are a pair of spaced arms 52. A pair of rollers 54 are disposed between and rotatably supported on the bracket arms 52. Rollers 54 are vertically spaced to define an intervening guide opening 55 through which extends the rear end of the stabilizer bar 42. This opening has the same general cross-section as the stabilizer bar, and permits rotation of the bar thus accommodating any twisting of the trailer in relation to the car.

In use, the trailer hitch frame 28 is attached to the rear wheels 18 of the towing vehicle 12 and the stabilizer bracket 44 is attached to the trailer hitch tongue 26. The stabilizer bar 42 extends between the rollers 54 of the bracket. The coupling parts 36, 38 on the trailer hitch 14 and hitch tongue 26 are joined. When the trailer 10 is thus coupled to the towing vehicle 12, the stabilizer bar 42 and bracket 44 retain the hitch frame and hitch tongue in coplanar relation. During movement of the vehicle and trailer over dips and humps, the hitch tongue and frame remain in coplanar relation, and the hitch frame pivots at its wheel couplings 34 about the rear wheel axis of the towing vehicle 16 to accommodate relative vertical angular movement of the vehicle trailer. The vertical axis of the coupling ball 36 remains perpendicular to the plane of the trailer hitch tongue.

This retention of the trailer hitch tongue 26 and hitch frame 28 in coplanar relation and pivoting of the frame at the wheel couplings 34 achieves two benefits. First, it eliminates excessive strain on the ball coupling 36, 38 and secondly, it reduces pitching of the trailer, that is pivoting of the trailer about its wheel axis when traveling over dips and humps. Another advantage of the present trailer hitch resides in its capability of use with the trailer surge brake 39. This capability stems from the fact that the trailer hitch tongue and hitch frame remain in coplanar relation at all times and the stabilizer bracket 44 can move longitudinally of the stabilizer bar 42 to accommodate the fore and aft movement of the trailer relative to the towing vehicle which is necessary to actuate the brake. Another advantage of the hitch is that the trailer tongue and towing loads are exerted directly on the rear vehicle wheels and thus do not cause jolting, bouncing, or swaying of the towing vehicle.

I claim:

1. A trailer hitch for an automotive vehicle, comprising:
    a generally U-shaped hitch frame including a pair of arms having front ends for straddling the rear vehicle wheels and a cross member extending between and joining the rear ends of said arms;
    wheel coupling members rotatably mounted on the front ends of said arms for attachment to said rear wheels;
    a coupling part at the center of said cross member for attachment to a mating coupling part on the trailer hitch tongue;
    a stabilizer bar extending rearwardly from the center of and pivotally connected to said cross member to swing laterally of said frame; and
    a stabilizer bracket including guide means providing a guide opening to receive the rear end of said stabilizer bar for longitudinal movement of the bar through said opening, and mounting means for attaching said bracket to said trailer hitch tongue with the axis of the opening extending longitudinally of the trailer.

2. A trailer hitch according to claim 1 wherein:
    said frame includes means whereby the spacing between said wheel coupling members may be adjusted to accommodate said hitch to different vehicles.

3. A trailer hitch according to claim 1 wherein:
    said frame is resilient to permit deflection of said arms toward and away from one another to adjust the spacing between said wheel coupling members for accommodating said hitch to different vehicles.

4. A trailer hitch according to claim 1 wherein:
    said cross member includes a hinged joint between its ends, whereby said arms may swing toward and away from one another to adjust the spacing between said wheel coupling members for adapting said hitch to different vehicles.

5. A trailer hitch according to claim 1 wherein:
    said bracket mounting means comprises means for removably attaching said bracket to the trailer hitch tongue.

6. A trailer hitch according to claim 1 wherein:
    said bracket comprises a pair of clamp members for straddling the hitch tongue frame members, and said bracket mounting means comprises means for urging said clamp members together into clamping engagement with said hitch tongue frame members.

7. A trailer hitch according to claim 1 wherein:
    said bracket guide means comprise a pair of vertically spaced rollers for straddling said stabilizer bar.

8. A trailer hitch according to claim 1 wherein:
    said frame includes means whereby the spacing between said wheel coupling members may be adjusted to accommodate said hitch to different vehicles;
    said bracket guide means comprise a pair of vertically spaced rollers for straddling said stabilizer bar.

9. A trailer hitch according to claim 8 wherein:
    said bracket comprises a pair of clamp members for straddling the hitch tongue frame members, and said bracket mounting means comprises means for urging said clamp members together into clamping engagement with said hitch tongue frame members.

10. A vehicle mounted hitch structure for a trailer hitch of the character described comprising:
    a generally U-shaped hitch frame including a pair of arms having front ends for straddling the rear vehicle wheels and a cross member extending between and joining the rear ends of said arms;
    wheel coupling members rotatably mounted on the front ends of said arms for attachment to said rear wheels;
    a coupling part at the center of said cross member for attachment to a mating coupling part on the trailer hitch tongue;
    a stabilizer bar extending rearwardly from the center of and pivotally connected to said cross member to swing laterally of said frame.

11. A hitch structure according to claim 10 wherein:
    said frame includes means whereby the spacing between said wheel coupling members may be adjusted to accommodate said hitch to different vehicles.

12. A hitch structure according to claim 10 wherein:
    said frame is resilient to permit deflection of said arms toward and away from one another to adjust the spacing between said wheel coupling members for accommodating said hitch to different vehicles.

13. A hitch structure according to claim 10 wherein:
    said cross member includes a hinged joint between its ends, whereby said arms may swing toward and away from one another to adjust the spacing between said wheel coupling members for adapting said hitch to different vehicles.

14. A trailer mounted stabilizer bracket structure for a trailer hitch of the character described, comprising:
    an elongate bracket to span the frame members of a trailer hitch tongue;
    mounting means for attaching said bracket to said frame members; and
    guide means providing a guide opening extending transversely of said bracket.

15. A stabilizer bracket according to claim 14 wherein:
    said bracket mounting means comprises means for removably attaching said bracket to the trailer hitch tongue.

16. A stabilizer bracket according to claim 14 wherein:
    said bracket comprises a pair of clamp members for straddling the hitch tongue frame members, and said bracket mounting means comprises means for urging said clamp members together into clamping engagement with said hitch tongue frame members.

17. A stabilizer bracket according to claim 14 wherein:
    said bracket guide means comprise a pair of vertically spaced rollers extending lengthwise of said bracket and defining said guide opening between the rollers.

* * * * *